United States Patent
Zia et al.

(10) Patent No.: US 11,642,949 B2
(45) Date of Patent: May 9, 2023

(54) WINDOW SEAL WITH LIQUID DIVERTER

(71) Applicant: Toyoda Gosei Co., Ltd., Kiyosu (JP)

(72) Inventors: Kashif Zia, Troy, MI (US); Kentaro Adachi, Aichi (JP); Ruben Vazquez, Troy, MI (US)

(73) Assignee: Toyoda Gosei Co., Ltd., Kiyosu (JP)

( * ) Notice: Subject to any disclaimer, the term of this patent is extended or adjusted under 35 U.S.C. 154(b) by 99 days.

(21) Appl. No.: 17/168,533

(22) Filed: Feb. 5, 2021

(65) Prior Publication Data
US 2022/0250456 A1 Aug. 11, 2022

(51) Int. Cl.
*B60J 10/70* (2016.01)
*F16J 15/3204* (2016.01)
*B60R 16/08* (2006.01)

(52) U.S. Cl.
CPC .............. *B60J 10/70* (2016.02); *B60R 16/08* (2013.01); *F16J 15/3204* (2013.01)

(58) Field of Classification Search
CPC .... F16J 15/00; F16J 15/16; F16J 15/50; F16J 15/52; F16J 15/32; F16J 15/3204; B60J 10/00; B60J 10/70; B60J 10/72; B60J 10/74–76; B60J 10/233; B60J 10/2335; B60J 10/45; B60J 10/77; B60J 10/777; B60J 10/85; B60J 10/87; B60J 1/00; B60J 5/00; B60J 5/0418; B60R 16/08; B60R 13/06; B60R 13/07
USPC ....................................................... 277/549
See application file for complete search history.

(56) References Cited

U.S. PATENT DOCUMENTS

| | | | | |
|---|---|---|---|---|
| 5,106,149 A | * | 4/1992 | Glossop, Jr. | B60J 10/25 296/213 |
| 5,209,546 A | * | 5/1993 | Hasegawa | B60J 7/022 296/213 |
| 7,073,294 B2 | * | 7/2006 | Yamaoka | B60J 10/80 49/475.1 |
| 10,232,693 B1 | * | 3/2019 | Williams | B60J 10/25 |
| 2015/0007504 A1 | | 1/2015 | Inai | |
| 2016/0250912 A1 | | 9/2016 | Borges Filho et al. | |

FOREIGN PATENT DOCUMENTS

JP 2008087744 A 4/2008

* cited by examiner

*Primary Examiner* — Nathan Cumar
(74) *Attorney, Agent, or Firm* — Christopher G. Darrow; Darrow Mustafa PC

(57) ABSTRACT

Window seals can be configured to divert water away from an area of the vehicle where the presence of water is not desired, such as a door latch. A window seal can include a first body member and a second body member. The first body member can include a main body and a lip extending from the main body. The lip can include an upper end and a lower end. The second body member can be angled relative to the first body member. The second body member can include a liquid diverter that has a collector portion in fluid communication with a gutter portion. The collector portion can include an inlet opening. The inlet opening can be operatively positioned to receive a liquid from the lower end of the lip, and the gutter portion can route the liquid away from undesired areas.

20 Claims, 7 Drawing Sheets

FIG. 5
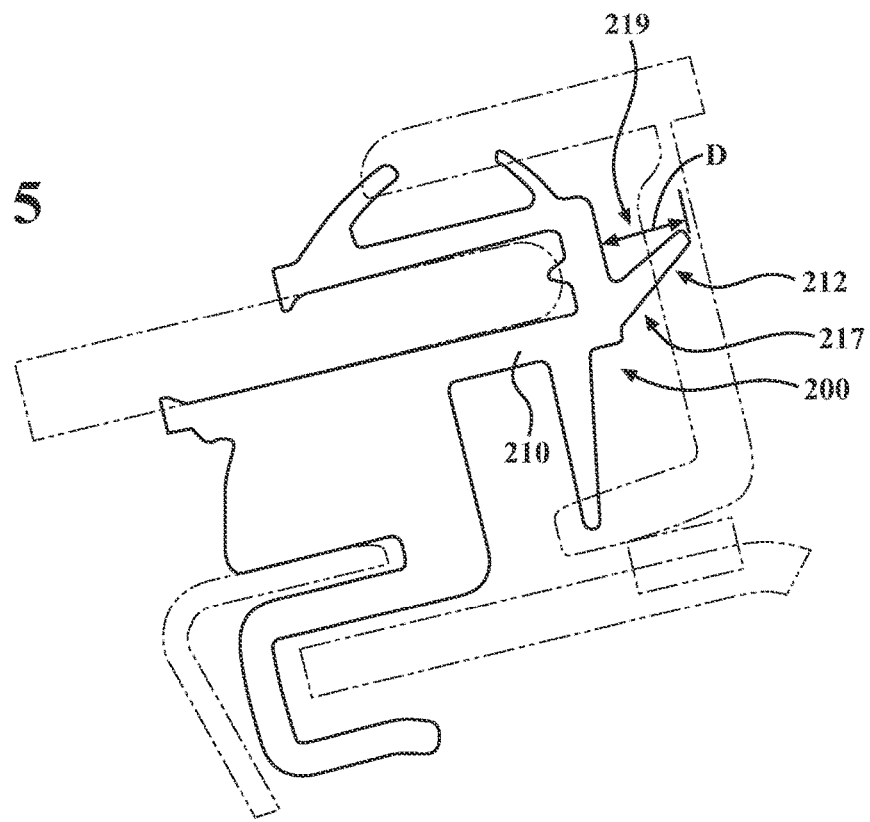
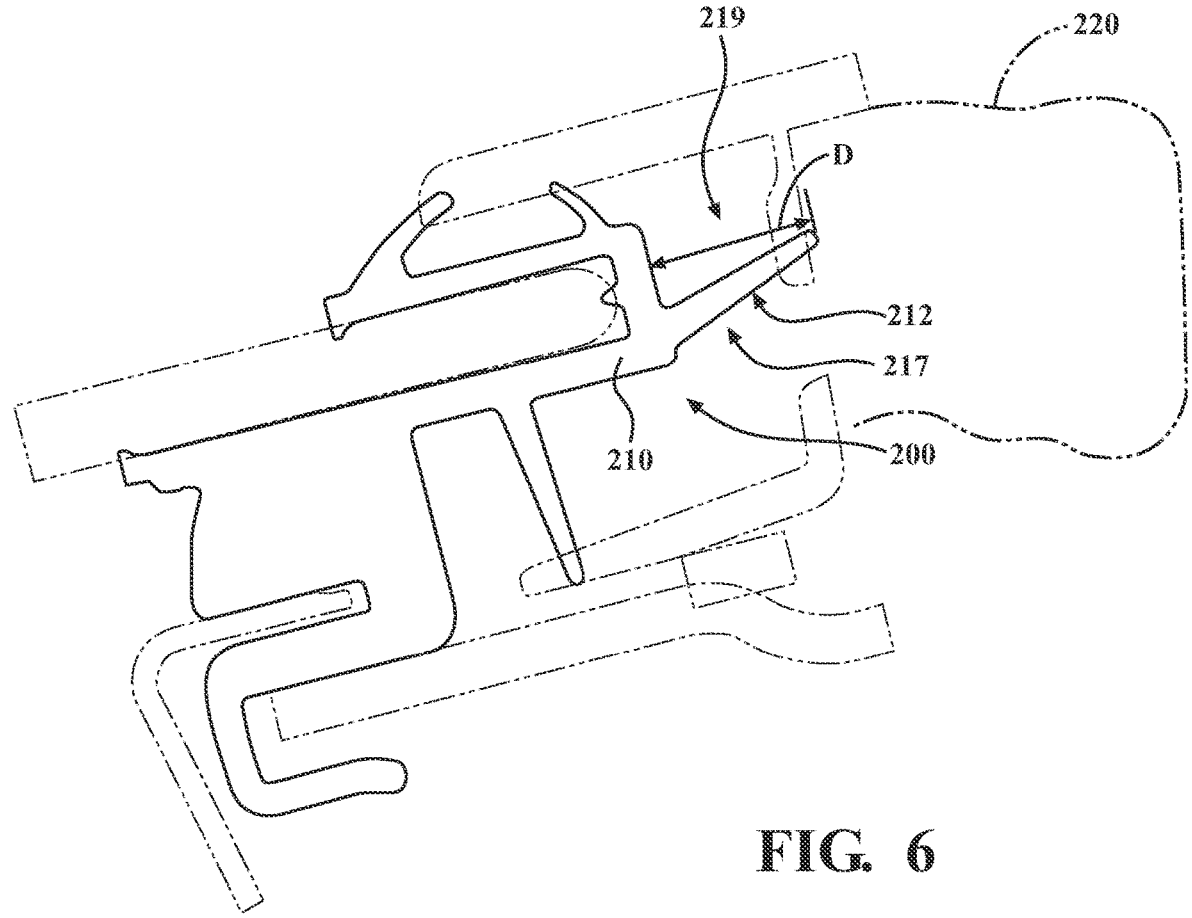
FIG. 6

US 11,642,949 B2

WINDOW SEAL WITH LIQUID DIVERTER

FIELD

The subject matter described herein relates in general to vehicles and, more particularly, to the management of water or other liquids that comes into contact with vehicles.

BACKGROUND

Vehicles can be exposed to water or other liquids at various times, such as when it is raining or during a car wash. Seals can be used to prevent water or other liquids from entering the interior of the vehicle or otherwise away from the vehicle itself. These seals can be used at various locations of the vehicle, such as at vehicle windows.

SUMMARY

In one respect, the present disclosure is directed to a window seal. The window seal includes a first body member and a second body member. The first body member includes a main body and a lip extending from the main body. The lip includes an upper end and a lower end. The second body member can be angled relative to the first body member. The second body member can include a liquid diverter. The liquid diverter including collector portion and a gutter portion. The collector portion can be in fluid communication with the gutter portion. The collector portion can include an inlet opening. The inlet opening can be operatively positioned to receive a liquid from the lower end of the lip.

In another respect, the present disclosure is directed to a vehicle. The vehicle can include one or more vehicle structures that define a window opening. A window glass can be positioned within the window opening. A window seal can be operatively positioned between the window glass and one or more vehicle structures that define the window opening. The window seal can engage at least a portion of a perimeter of the window glass. The window seal can include a first body member and a second body member. The first body member can include a main body and a lip. The lip can include an upper end and a lower end. The second body member can be angled relative to the first body member. The second body member can include a liquid diverter. The liquid diverter can include a collector portion and a gutter portion. The collector portion can be in fluid communication with the gutter portion. The collector portion can include an inlet opening. The inlet opening can be operatively positioned to receive a liquid from the lower end of the lip.

BRIEF DESCRIPTION OF THE DRAWINGS

FIG. 5 is a cross-sectional view of the window seal, viewed along line 5-5 in FIG. 4.
FIG. 6 is a cross-sectional view of the window seal, viewed along line 6-6 in FIG. 4.

DETAILED DESCRIPTION

Figure 1:
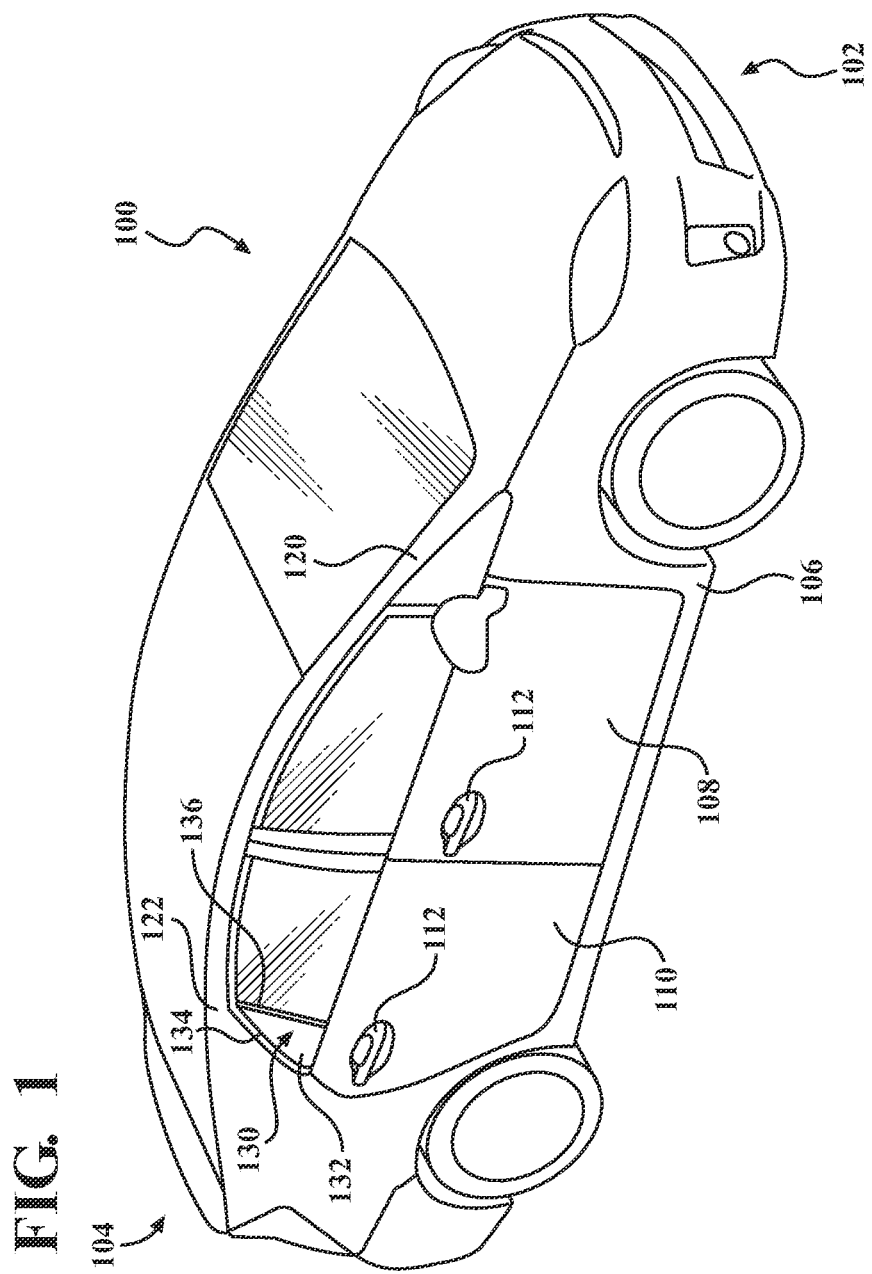
FIG. 1 is an example of a vehicle.
Figure 2:
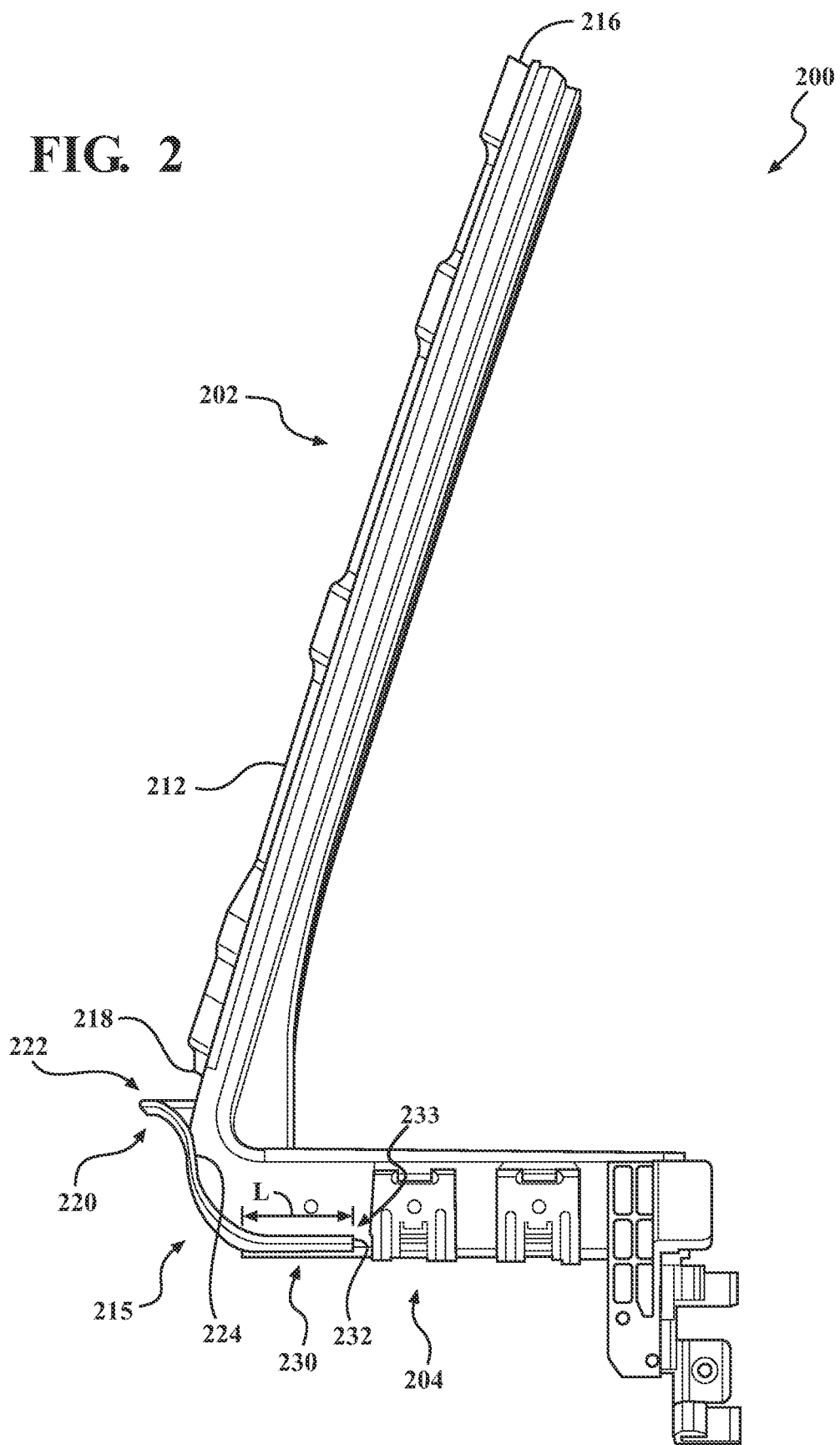
FIG. 2 is a first view of an example of a window seal.
Figure 3:
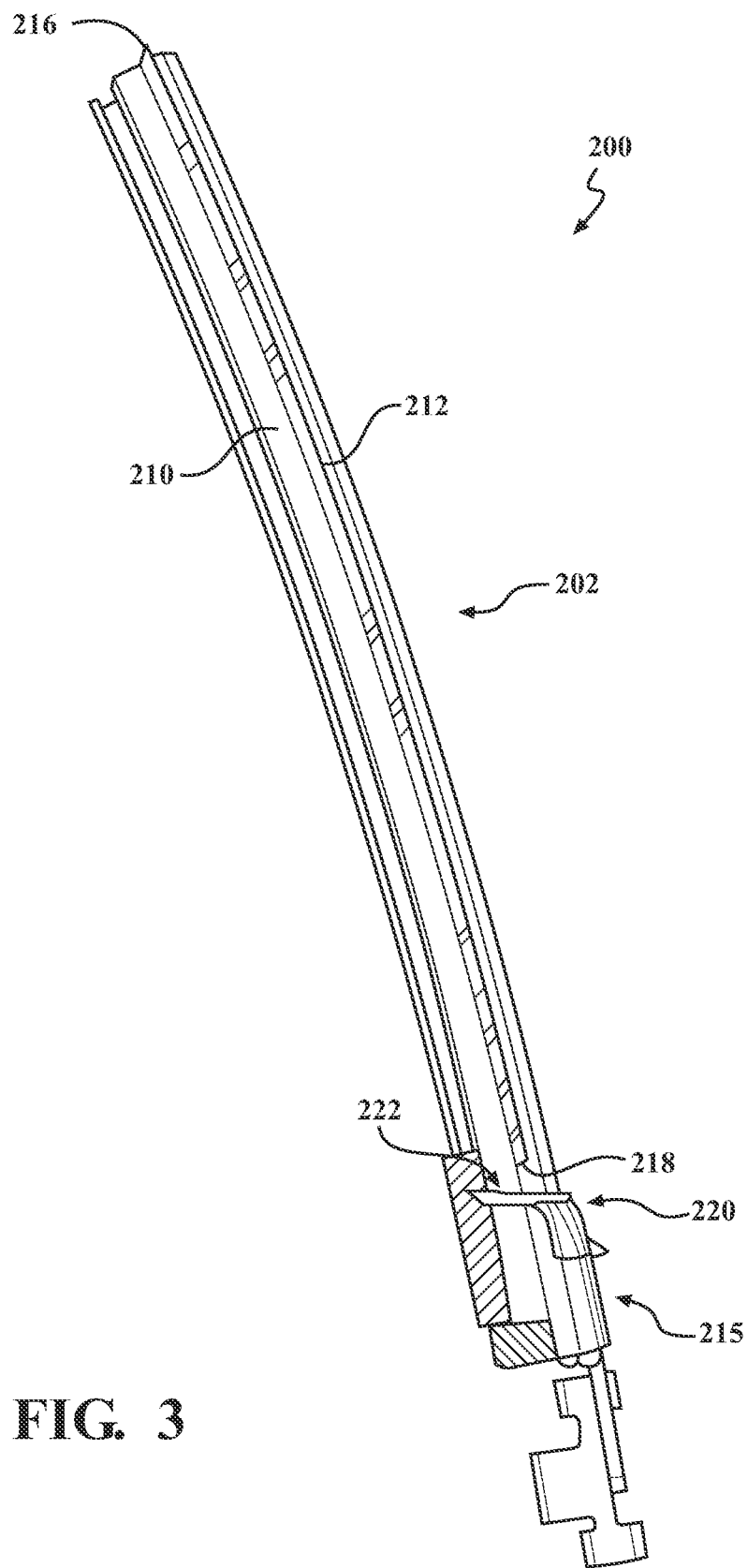
FIG. 3 is a second view of the window seal.
Figure 4:
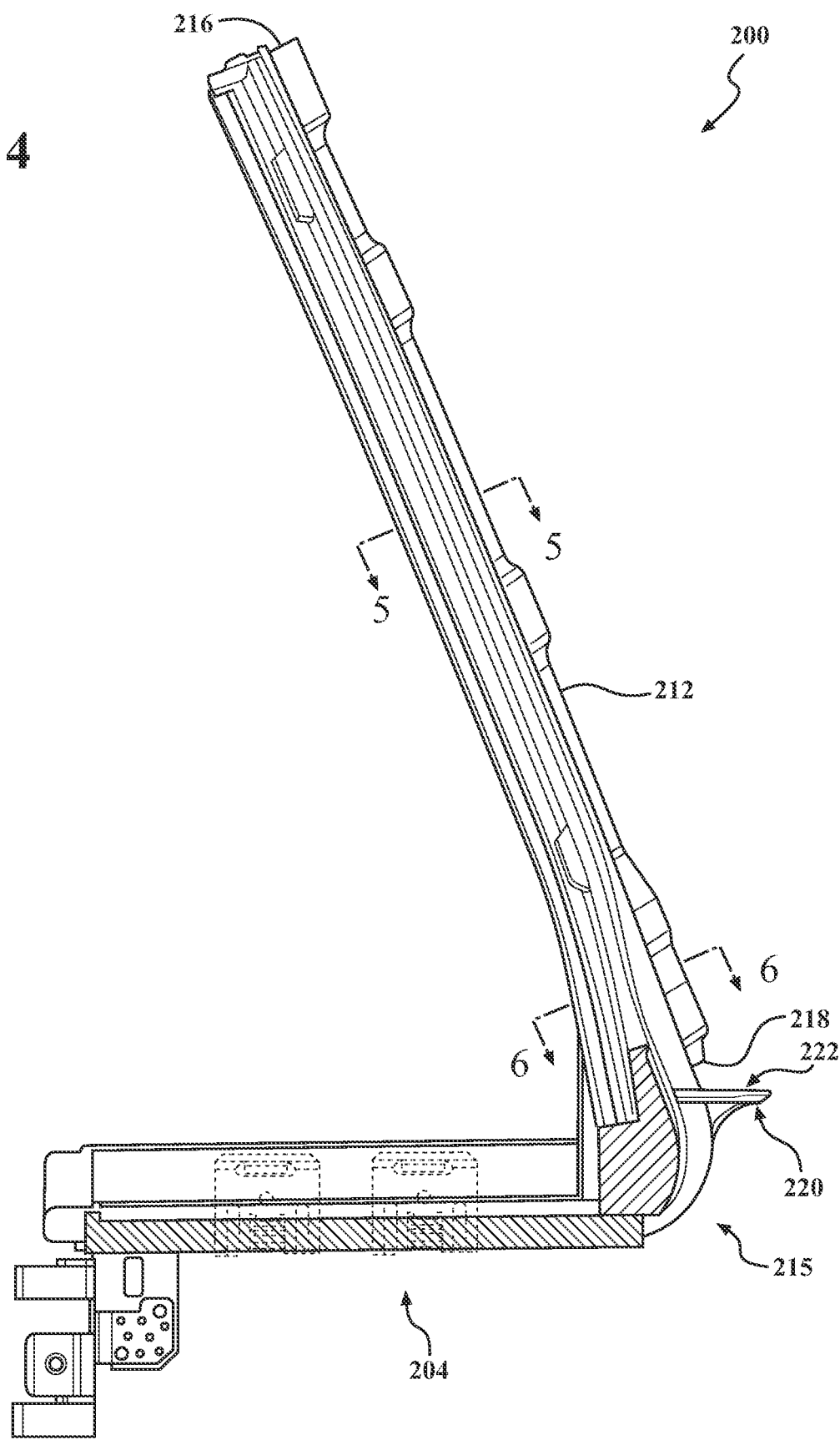
FIG. 4 is a third view of the window seal.

In some vehicular sealing arrangements, water can inadvertently reach undesired locations of the vehicle. For instance, a portion of water draining from a vehicle pillar may come into contact with a door latch, as may occur when water runs along an inner side of a window seal. In colder climates, water on the latch can freeze, making it difficult or even impossible for the door to be opened by a person.

Accordingly, arrangements described herein are directed to seals and sealing arrangements for diverting water or other liquids away from areas of a vehicle where the presence of water or other liquids is not desired (e.g., a door latch). A window seal can include a liquid diverter. The liquid diverter can be configured to include a collector portion and a gutter portion. The collector portion can be operatively positioned to receive water, and the gutter portion can guide the water received in the collector portion away from certain areas of the vehicle. For instance, such arrangements can reduce the amount of water reaching the latch area and can avoid the latch freezing.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 is shown. The vehicle 100 can be any type of vehicle. While the vehicle 100 will be described herein as being an automobile, it will be appreciated that the vehicle 100 can be any type of vehicle that may come into contact with water or other liquids during its use. Further, arrangements presented herein will be described in connection with managing and/or diverting water, but it will be appreciated that the arrangements described herein can be used, alternatively or additionally, for managing and/or diverting other liquids.

The vehicle 100 can include a forward end 102 and a rearward end 104. The vehicle 100 can include a vehicle body 106. The vehicle 100 can include a plurality of doors, including a front door 108 and a rear door 110. The doors can be pivotably attached to the vehicle body 106 in any suitable manner, now know or later developed. The vehicle 100 can include a latch to keep the door held closed. Any suitable type of latch, now known or later developed, can be used. The latch can be engaged or disengaged in any suitable manner. The doors can include a handle 112.

The vehicle 100 can include a plurality of pillars. The pillars are often sequentially labeled using alphabetic letters, starting from the forward end 102 and moving toward the rearward end 104 of the vehicle 100. Thus, a vehicle can include an A-pillar, B-pillar, the C-pillar, and so on. There can be any number of pillars. In the example shown in FIG. 1, the vehicle 100 can include a forward-most pillar 120 and a rearward-most pillar 122.

The vehicle 100 can include a plurality of windows. For instance, the vehicle 100 can include a quarter window 130. While arrangements will be described herein in connection with the quarter window 130, it will be understood that such arrangements can, alternatively or additionally, be applied to other windows of the vehicle 100.

The quarter window 130 can be a part of the rear door 110. Thus, the quarter window 130 can move with the rear door 110. The quarter window 130 can be a static window. Thus, the quarter window 130 is not intended to move relative to the rear door 110, such as by being opened or closed. The quarter window 130 can include window glass 132 located in a window opening 134. The window opening 134 can be defined at least in part by the rearward-most pillar 122, a division bar 136, and/or other portions of the rear door 110. The quarter window 130 can have any suitable size, shape, and/or configuration. In some arrangements, the quarter window 130 can be generally triangular in shape.

A window seal can be operatively positioned between the window glass 132 and one or more vehicle structure that define the window opening 134. The window seal can prevent the infiltration of water into the vehicle 100. The window seal can be a weather strip.

According to arrangements herein, the window seal can be configured to divert water away from areas of the vehicle 100 where the presence of water is not desired. For instance, the window seal can be configured to divert water away from a door latch. One example of a window seal 200 according to arrangements herein is shown in FIGS. 2-9. The window seal 200 can be made of any suitable material. For instance, the window seal 200 can be made of a thermoplastic elastomer. In one or more arrangements, the window seal 200 can be made of Santoprene, which is available from Exxon Mobil Corporation, Irving, Tex. As another example, the window seal 200 can be made of ethylene propylene diene monomer (EDPM) rubber. It will be appreciated that the window seal 200 can surround at least a portion of the quarter window 130. Thus, one or more additional seals can be used along the other portions of the quarter window 130.

The window seal 200 can have any suitable size, shape, and/or configuration. The window seal 200 can be configured to engage between at least a portion of the perimeter of the window glass 132 and the neighboring door structure(s) that form the window opening 134. In some arrangements, the window seal 200 can include various connectors for attaching the window seal 200 to one or more vehicle structures.

The window seal 200 can include a first body member 202 and a second body member 204. In some arrangements, the first body member 202 and a second body member 204 can be a unitary structure, which can be formed by, for example, injection molding. In other arrangements, first body member 202 and a second body member 204 can be formed as separate pieces, which may or may not be subsequently joined together.

The first body member 202 and the second body member 204 can be angled relative to each other, depending on the geometry of the quarter window 130. The first body member 202 can extend in a generally vertical direction. The term generally vertical and other position, location, and/or orientation terms are used for convenience to indicate the intended position, location, and/or orientation of the respective component or portion thereof when the window seal 200 is installed in its intended operational position. It will be appreciated that such terms are not intended to be limiting.

The first body member 202 can configured to engage the window glass 132 and one or more door structures. The first body member 202 can include a main body 210 a rear lip 212. The rear lip 212 can extend away from the main body 210. The rear lip 212 can extend from the main body 210 generally in a direction toward the rearward end 104 of the vehicle 100. The rear lip 212 can include an upper end 216 and a lower end 218. The rear lip 212 can have an inner side 217 and an outer side 219. The inner side 217 can generally face toward a cabin of the vehicle 100, and the outer side 219 can generally face toward the exterior of the vehicle 100. The rear lip 212 can have any suitable cross-sectional size, shape, and/or configuration. The cross-sectional size, shape, and/or configuration of the rear lip 212 can be substantially constant along its length, or it can vary in one or more places along its length. For instance, the rear lip 212 can extend a distance D away from the main body 210, as is shown in FIGS. 5 and 6. The distance D can be substantially constant along the length of the rear lip 212, or the distance D can vary in one or more places along the length of the rear lip 212. For example, the length D can be greater at the section in FIG. 6 compared to at the section in FIG. 5.

The second body member 204 can extend in a substantially horizontal direction. The second body member 204 can be configured to divert water away from an area of the vehicle where the presence of water is not desired. The second body member 204 can include a liquid diverter 215. The liquid diverter 215 can include a collector portion 220 and a gutter portion 230. The collector portion 220 can be configured to receive water runoff from the first body member 202, such as water runoff from the rear lip 212. The gutter portion 230 can be configured to route water to a desired location. The collector portion 220 can be in fluid communication with the gutter portion 230.

The collector portion 220 can include an inlet opening 222. The inlet opening 22 can open in generally an upward direction. The collector portion 220 can include one or more inner walls 224. The inner wall(s) 224 can be configured to facilitate drainage of water received therein to the gutter portion 230. The inner wall(s) 224 can be downwardly sloped from the inlet opening 222. The inlet opening 222 can have any suitable size, shape, and/or configuration.

The collector portion 220 can transition to the gutter portion 230. The gutter portion 230 can be substantially u-shaped, substantially c-shaped, substantially j-shaped, or substantially v-shaped in cross-sectional shape. The gutter portion 230 can be open in generally the upward direction. The gutter portion 230 can extend a length L along the second body member 204. The gutter portion 230 can include an outlet end 232 and an outlet opening 233. At the outlet end 232, water received in the collector portion 220 can exit through the outlet opening 233 and flow over the exterior of the vehicle 100.

The gutter portion 230 can extend in any suitable manner. In one or more arrangements, the gutter portion 230 can be substantially straight. However, in other arrangements, the gutter portion 230 can include one or more non-straight features. The gutter portion 230 can have a slight downward angle toward the forward end 102 of the vehicle 100, which can facilitate diversion of water received in the gutter portion 230 in a direction toward the forward end 102 of the vehicle 100. For instance, the gutter portion 230 can have an angle of about 10 degrees or less relative to horizontal, about 5 degrees or less relative to horizontal, about 4 degrees or less relative to horizontal, about 3 degrees or less relative to horizontal, about 2 degrees or less relative to horizontal, or about 1 degrees or less relative to horizontal.

A noted above, the collector portion 220 can be operatively positioned to receive water from the lower end 218 of the rear lip 212 and/or the first body member 202. The lower end 218 of the rear lip 212 can be spaced from the inlet opening 222. The lower end 218 of the rear lip 212 can be located above the inlet opening 222 in the elevational direction.

Figure 9:
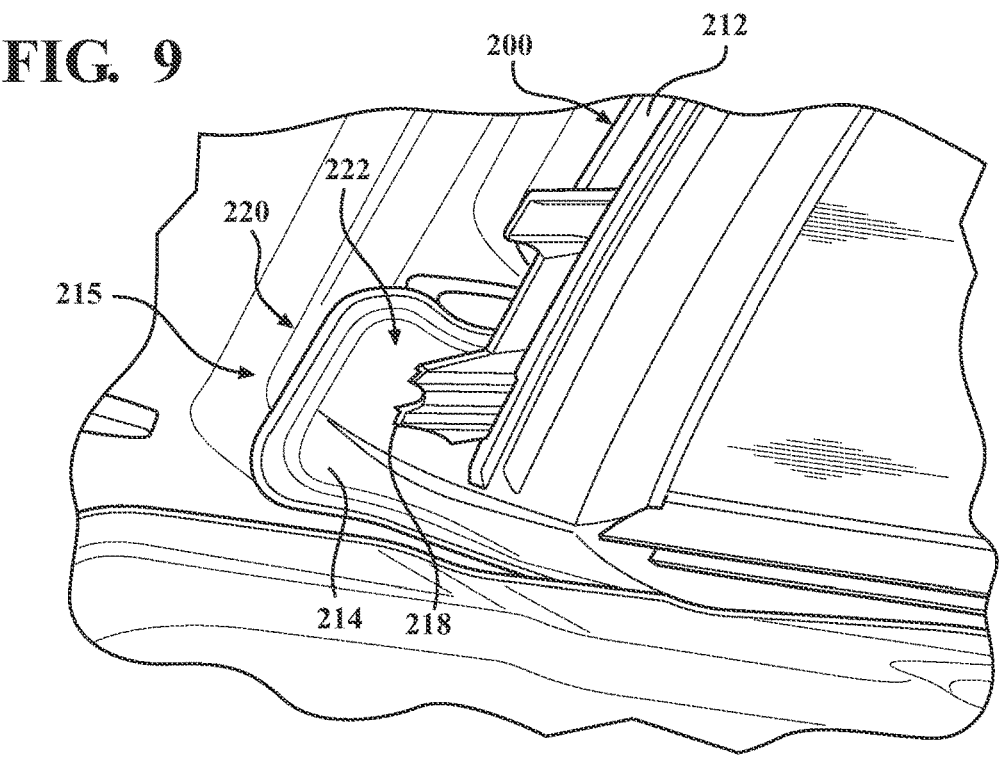
FIG. 9 is a view of a portion of the window seal, showing a lower end of a first body member operatively positioned relative to a collector portion of the liquid diverter.

There can be any suitable relationship between the collector portion 220 and the rear lip 212. FIG. 9 shows one example of a relationship between the collector portion 220 and the rear lip 212. FIG. 9 generally presents a view looking down on the collector portion 220 from above.

The collector portion 220 can be substantially aligned with the lower end 218 of the rear lip 212. The inlet opening 222 of the collector portion 220 can extend farther toward the rearward end 104 of the vehicle 100 than the rear lip 212 and/or the first body member 202. Further, the inlet opening 222 of the collector portion 220 can be larger widthwise (e.g., in the left-right direction of the vehicle 100) than the rear lip 212 and/or the first body member 202. As can be seen in FIG. 9, the lower end 218 of the rear lip 212 does not extend outside of the envelope of the collector portion 220. Thus, if an imaginary projection of the perimeter of the inlet opening 222 was projected vertically upward, the lower end 218 of the rear lip 212 would be located entirely within the imaginary projection.

Figure 8:
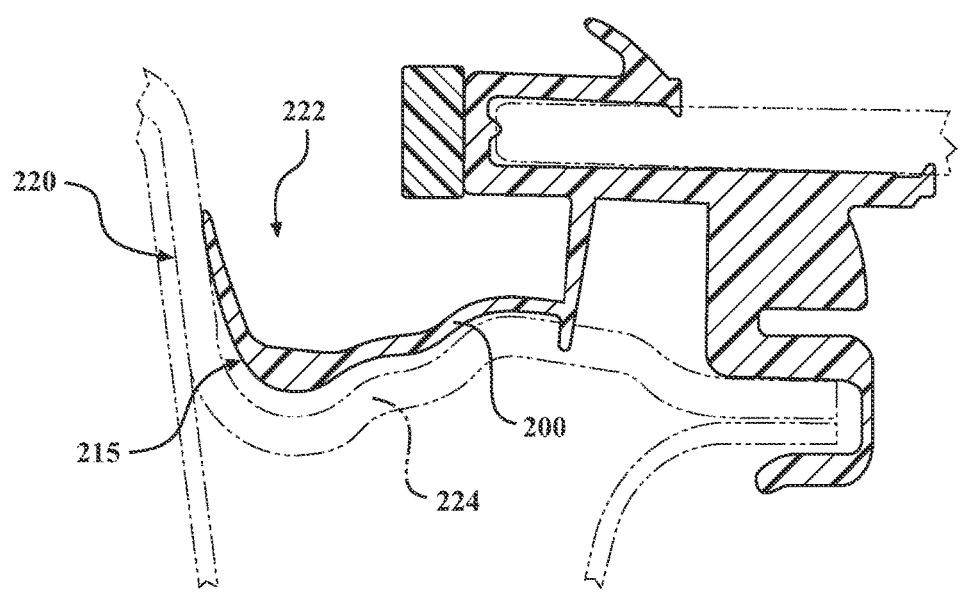
FIG. 8 is a cross-sectional view of a portion of a vehicle door, showing engagement between the liquid diverter and one or more vehicle structures.

Referring to FIG. 8, a cross-sectional view of a portion of the rear door 110. When the window seal 200 is installed, the collector portion 220 and/or the gutter portion 230 can engage one or more structures 244 of the rear door 110. The structure(s) 244 can be made of sheet metal. The collector portion 220 and/or the gutter portion 230 can be configured to substantially matingly engage the structure(s) 244 of the rear door 110. As a result, a sealed interface can be formed. In some arrangements, the collector portion 220, the gutter portion 230, and/or the window seal 200 can be operatively connected to the structure(s) of the rear door 110 by frictional engagement. Alternatively or additionally, the collector portion 220, the gutter portion 230, and/or the window seal 200 can be operatively connected to the structure(s) 244 by one or more fasteners, one or more adhesives, one or more forms of mechanical engagement, or any combination thereof. In some arrangements, at least a rear side 240 and a lower side 242 of the liquid diverter 215 can directly contact the structure(s) 244. Such direct contact can have beneficial effects with respect to noise, vibration, and/or harshness characteristics of the vehicle 100. For instance, noise within a cabin of the vehicle 100 can be reduced.

Figure 7:
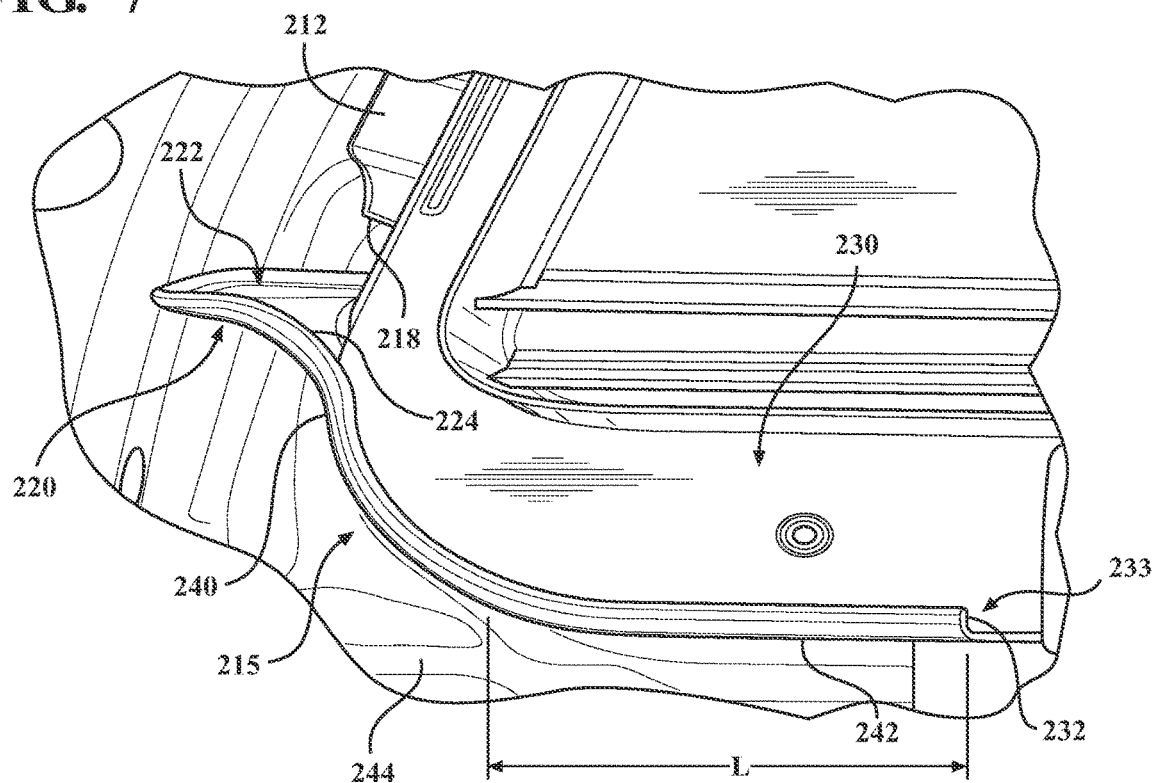
FIG. 7 is a view of a portion of a liquid diverter of the window seal.
Figure 10:
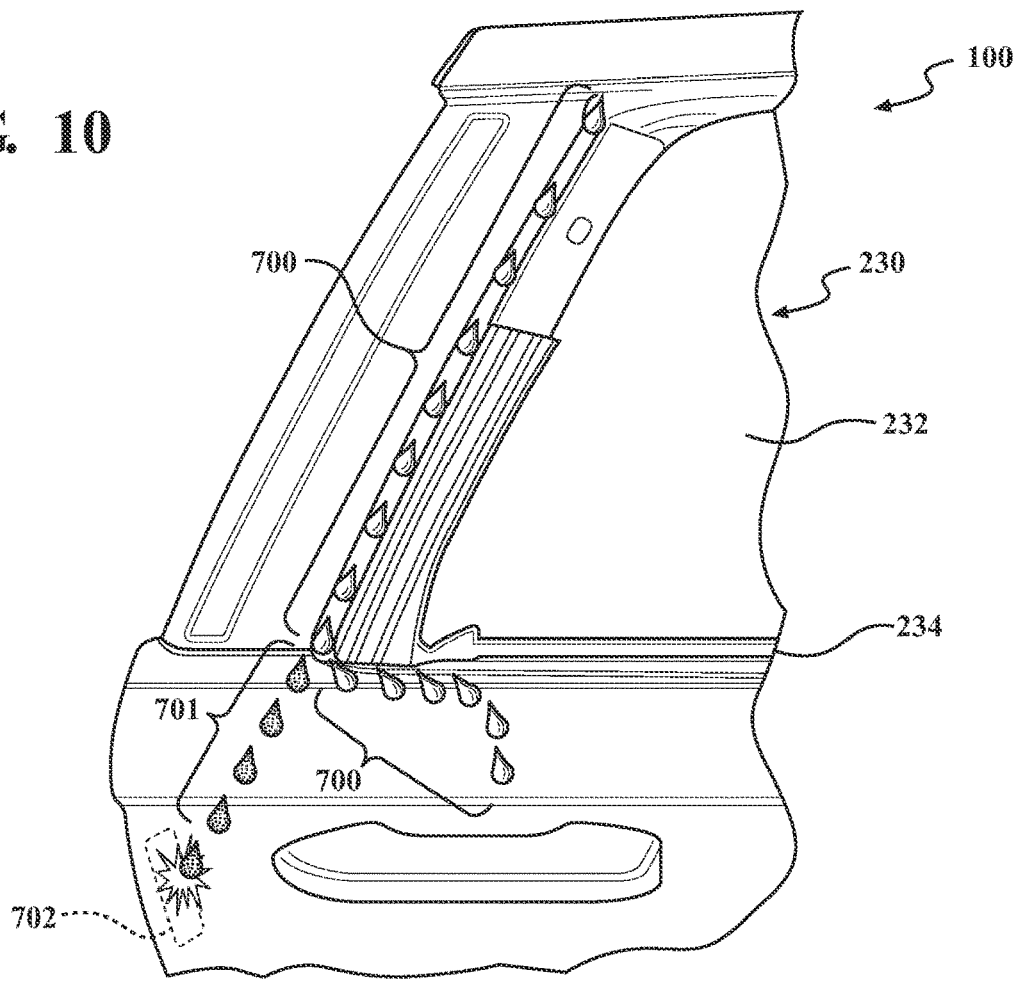
FIG. 10 shows an example of a change in a water flow path due to the liquid diverter of the window seal.

FIG. 10 is an example of a change in a water flow due to the arrangements described here. Water 700, such as from rainfall or a car wash, can come into contact with the top of the vehicle 100 at or near the rearward-most pillar 122. The water 700 can flow down the first body member 202 of the window seal 200. When the water 700 reaches the lower end 218 of the rear lip 212, the water can drop off of the rear lip 212 and fall into the inlet opening 222 of the collector portion 220. The water 700 can be routed downwardly by the inner wall(s) 224 of the collector portion 220 and into the gutter portion 230. The gutter portion 230 can route the water 700 toward the forward end 102 of the vehicle 100 and away from the latch 702. The water 700 can be guided along by gravity along the downward angle of the gutter portion 230. When the water 700 reaches the outlet end 232, the water 700 can exit the gutter portion 230. The water 700 can then flow over the exterior of the vehicle. As a result, the exposure of the latch 702 to water can be reduced or even eliminated. In this way, latch freezing can be avoided. FIG. 7 also shows an example of a potential flow of the water 701 without the use of the arrangements described herein. In such case, water 701 may come into contact with the latch 702, potentially causing the latch to freeze in cold temperature environments.

It will be appreciated that arrangements described herein can provide numerous benefits, including one or more of the benefits mentioned herein. For example, arrangements described herein can divert water away from an undesired area of a vehicle, such as away from a door latch area. Arrangements described herein can help to avoid latch freezing issues. Arrangements described herein can prevent water, even when it enters on the inner side of the rear lip of the first body member of the window seal, from reaching the latch. Arrangements described herein can create a seal with the surrounding sheet metal of the door. Arrangements described herein can improve the noise, vibration, and/or harshness characteristics of the vehicle. Arrangements described herein can improve vehicle user comfort.

The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A window seal including:
  a first body member, the first body member including a main body and a lip, the lip extending away from the main body, the lip including an upper end and a lower end; and
  a second body member, the second body member being angled relative to the first body member, the second body member including a liquid diverter, the liquid diverter including collector portion and a gutter portion, the collector portion being in fluid communication with the gutter portion, the collector portion including an inlet opening, the collector portion transitioning to the gutter portion by a downwardly sloped wall,
the inlet opening being operatively positioned to receive a liquid from the lower end of the lip, the inlet opening being partially defined by the first body member.

2. The window seal of claim 1, wherein the first body member and the second body member are a unitary structure.

3. The window seal of claim 1, wherein the gutter portion is one of substantially u-shaped, substantially c-shaped, substantially j-shaped, and substantially v-shaped in cross-sectional shape.

4. The window seal of claim 1, wherein the gutter portion is angled downwardly.

5. The window seal of claim 1, wherein the window seal is made of a thermoplastic elastomer.

6. The window seal of claim 1, wherein the lower end of the lip and the inlet opening of the collector portion are spaced from each other in an elevational direction.

7. The window seal of claim 1, wherein the gutter portion extends a length along the second body member to an outlet end including an outlet opening, whereby the liquid received in the inlet opening of the collector portion exits the liquid diverter through the outlet opening.

8. The window seal of claim 1, wherein the collector portion includes an inner wall, and wherein the inner wall is downwardly sloped.

9. A vehicle comprising:
one or more vehicle structures defining a window opening;
a window glass positioned within the window opening to form a vehicle window; and
a window seal operatively positioned between the window glass and the one or more vehicle structures defining the window opening, the window seal including:
a first body member, the first body member including a main body and a lip, the lip extending away from the main body, the lip including an upper end and a lower end; and
a second body member, the second body member being angled relative to the first body member, the second body member including a liquid diverter, the liquid diverter including collector portion and a gutter portion, the collector portion being in fluid communication with the gutter portion, the collector portion including an inlet opening, the collector portion transitioning to the gutter portion by a downwardly sloped wall,
the inlet opening being operatively positioned to receive a liquid from the lower end of the lip, the inlet opening being partially defined by the first body member.

10. The vehicle of claim 9, wherein at least one of a lower side and a rear side of the liquid diverter directly contacts one or more vehicle structures.

11. The vehicle of claim 9, further including a vehicle door, wherein the one or more vehicle structures include one or more vehicle door structures.

12. The vehicle of claim 11, wherein the vehicle door is configured to engage a latch provided on a body of the vehicle, and wherein the gutter portion routes the liquid received in the collector portion away from the latch.

13. The vehicle of claim 9, wherein the vehicle window is a quarter window.

14. The vehicle of claim 9, wherein the lower end of the lip is spaced above the inlet opening of the collector portion in an elevational direction.

15. The vehicle of claim 9, wherein the first body member and the second body member are a unitary structure.

16. The vehicle of claim 9, wherein the gutter portion is one of substantially u-shaped, substantially c-shaped, substantially j-shaped, and substantially v-shaped in cross-sectional shape.

17. The vehicle of claim 9, wherein the gutter portion is angled downwardly toward a forward end of the vehicle, whereby the gutter portion is configured to divert water received in the collector portion toward the forward end of the vehicle.

18. The vehicle of claim 9, wherein the gutter portion extends a length along the second body member to an outlet end including an outlet opening, whereby the liquid received in the inlet opening of the collector portion exits the liquid diverter through the outlet opening.

19. The vehicle of claim 9, wherein the collector portion includes an inner wall, and wherein the inner wall is downwardly sloped.

20. The vehicle of claim 9, wherein the inlet opening of the collector portion extends farther to a rearward end of the vehicle than the lip.

* * * * *